United States Patent
Kindl et al.

(10) Patent No.: US 9,624,823 B2
(45) Date of Patent: *Apr. 18, 2017

(54) INTERNAL COMBUSTION ENGINE WITH DEACTIVATABLE CYLINDER, AND METHOD FOR OPERATING AN INTERNAL COMBUSTION ENGINE OF SAID TYPE

(71) Applicant: Ford Global Technologies, LLC, Dearborn, MI (US)

(72) Inventors: Helmut Matthias Kindl, Aachen (DE); Werner Willems, Aachen (DE); Vanco Smiljanovski, Bedburg (DE); Norbert Andreas Schorn, Aachen (DE); Franz Arnd Sommerhoff, Aachen (DE); Andreas Kuske, Geulle (NL); Joerg Kemmerling, Monschau (DE); Franz Brinkmann, Huerth-Efferen (DE); Rob Stalman, Selfkant (DE)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

This patent is subject to a terminal disclaimer.

(21) Appl. No.: 14/265,204

(22) Filed: Apr. 29, 2014

(65) Prior Publication Data

US 2014/0331667 A1    Nov. 13, 2014

(30) Foreign Application Priority Data

May 8, 2013  (DE) .................. 10 2013 208 510
May 8, 2013  (DE) .................. 10 2013 208 516
Jun. 7, 2013  (DE) .................. 10 2013 210 664

(51) Int. Cl.
*F02B 37/22* (2006.01)
*F02D 41/00* (2006.01)
(Continued)

(52) U.S. Cl.
CPC ............ *F02B 37/22* (2013.01); *F01N 13/107* (2013.01); *F02B 37/025* (2013.01); *F02D 17/02* (2013.01);
(Continued)

(58) Field of Classification Search
CPC ...... F01N 13/107; F02B 37/025; F02B 37/22; F02D 17/02; F02D 23/00; F02D 41/0007;
(Continued)

(56) References Cited

U.S. PATENT DOCUMENTS

| 3,383,092 A * | 5/1968 | Cazier ................... F02B 37/02 |
| | | 415/186 |
| 6,216,459 B1 * | 4/2001 | Daudel ................ F02B 37/025 |
| | | 60/602 |

(Continued)

FOREIGN PATENT DOCUMENTS

| DE | 3145835 A1 | 5/1983 |
| DE | 19826355 A1 | 12/1999 |

(Continued)

OTHER PUBLICATIONS

Machine Translation of WO 2012/136234 A1, published on Oct. 2012.*
Machine Translation of EP 2206898 (A1) (Laemmermann).*

*Primary Examiner* — Kenneth Bomberg
*Assistant Examiner* — Brandon Lee
(74) *Attorney, Agent, or Firm* — Julia Voutyras; McCoy Russell LLP

(57) ABSTRACT

A method and system is provided for a turbocharged multi-cylinder internal combustion engine comprising a two-channel turbine and at least two groups of cylinders, wherein one group of cylinders is switchable responsive to an engine load over a threshold. Exhaust lines of each group of cylinders are arranged in a targeted manner to couple with
(Continued)

the turbine such that the switchable group is attached to one channel and the active group is attached to the other channel to reduce the difference in distances that pressure pulses travel, wherein a shut-off element is provided in the channel attached to the switchable group and may be moved to block exhaust flow through the channel when the cylinders are deactivated, thus improving the partial deactivation and turbocharging characteristics of the engine.

19 Claims, 7 Drawing Sheets

(51) Int. Cl.
  *F01N 13/10* (2010.01)
  *F02B 37/02* (2006.01)
  *F02D 17/02* (2006.01)
  *F02D 23/00* (2006.01)
  *F02M 26/43* (2016.01)

(52) U.S. Cl.
  CPC ......... *F02D 23/00* (2013.01); *F02D 41/0007* (2013.01); *F02D 41/0087* (2013.01); *F02M 26/43* (2016.02); *Y02T 10/144* (2013.01)

(58) Field of Classification Search
  CPC .............. F02D 41/0087; Y02T 10/144; F02M 25/0749
  See application file for complete search history.

(56) References Cited

U.S. PATENT DOCUMENTS

| | | | |
|---|---|---|---|
| 6,381,960 B1 * | 5/2002 | Mardberg | ............. F02B 37/025 60/602 |
| 6,786,190 B2 * | 9/2004 | Wu | ......................... F02D 17/02 123/198 F |
| 2006/0270519 A1 * | 11/2006 | Kamada | ................. B60K 6/442 477/3 |
| 2012/0159946 A1 | 6/2012 | Sauerstein | |

FOREIGN PATENT DOCUMENTS

| | | | | |
|---|---|---|---|---|
| DE | 19924228 A1 | 12/2000 | | |
| DE | 10354280 A1 | 6/2004 | | |
| DE | 102005049552 A1 | 6/2006 | | |
| DE | 102007057310 A1 | 6/2009 | | |
| DE | EP 2206898 A1 * | 7/2010 | ........... F01N 3/2066 | |
| DE | 102009027203 A1 | 1/2011 | | |
| DE | 112010003626 T5 | 7/2012 | | |
| EP | 2146072 A1 | 1/2010 | | |
| EP | 2206898 A1 | 7/2010 | | |
| GB | 1554074 A | 10/1979 | | |
| JP | 2007285169 A | 11/2007 | | |
| WO | 04001210 A1 | 12/2003 | | |
| WO | 20120136234 A1 | 10/2012 | | |
| WO | WO 2012136234 A1 * | 10/2012 | ............. F01D 9/026 | |

* cited by examiner

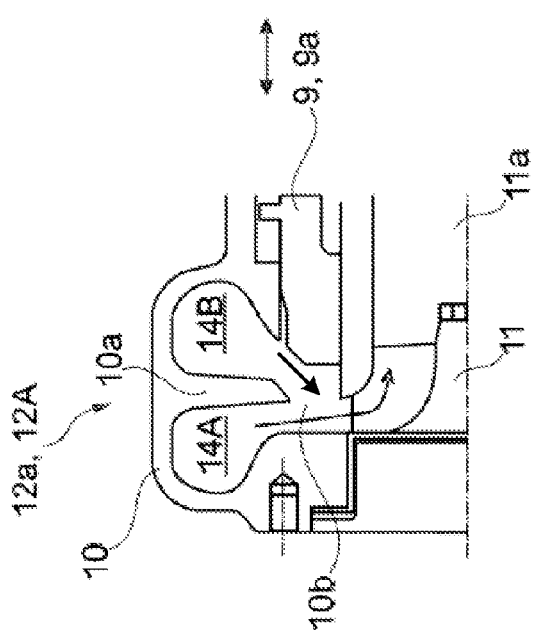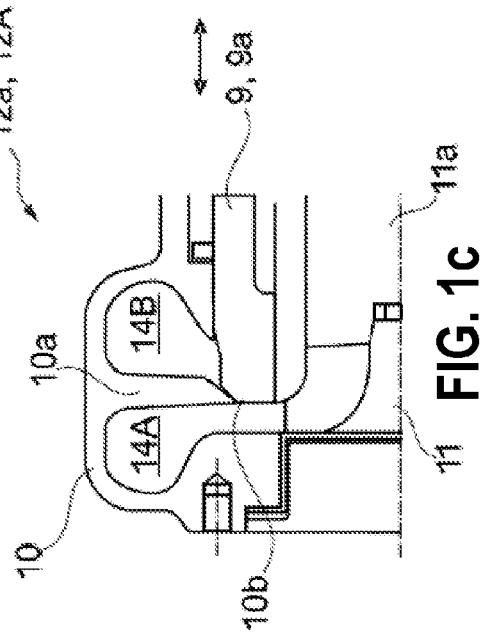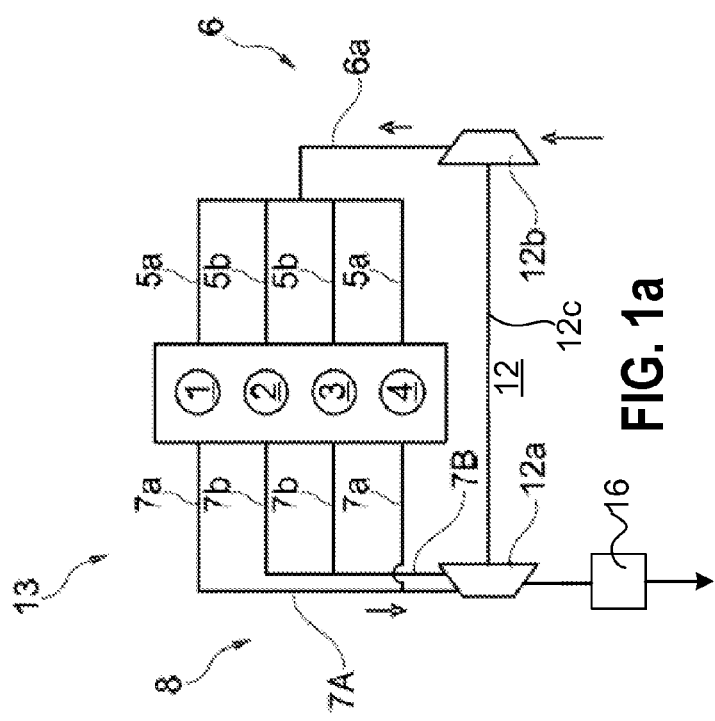

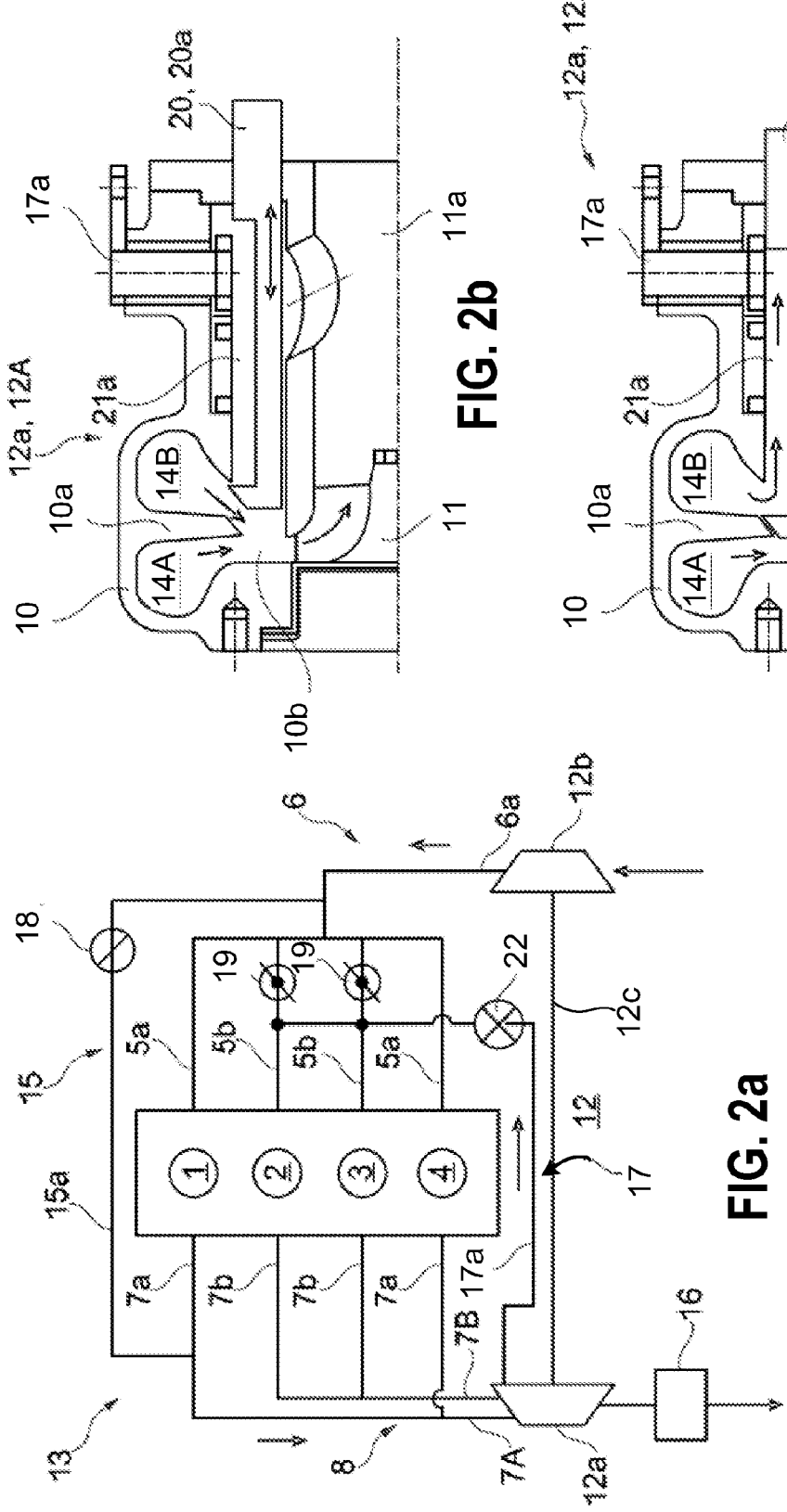
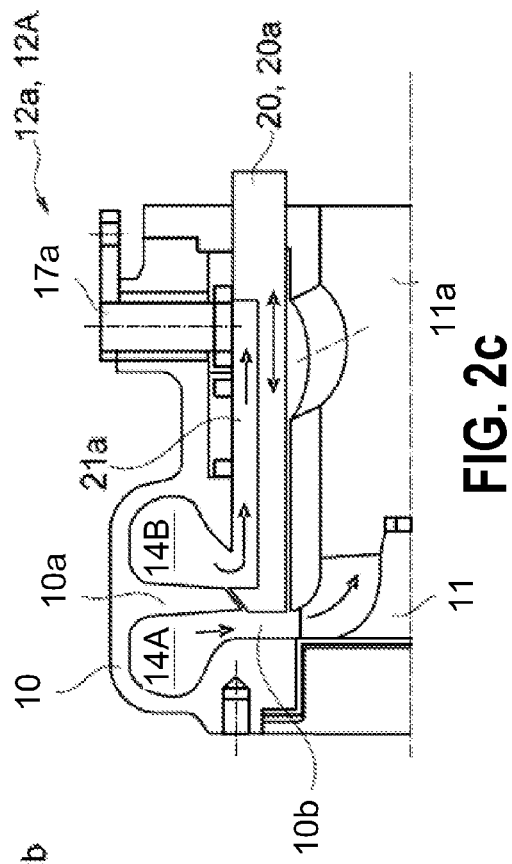
FIG. 2a
FIG. 2b
FIG. 2c

INTERNAL COMBUSTION ENGINE WITH DEACTIVATABLE CYLINDER, AND METHOD FOR OPERATING AN INTERNAL COMBUSTION ENGINE OF SAID TYPE

CROSS REFERENCE TO RELATED APPLICATIONS

The present application claims priority to German Patent Application No. 102013208510.9, filed May 8, 2013, German Patent Application No. 102013208516.8, filed May 8, 2013, and German Patent Application No. 102013210664.5, filed Jun. 7, 2013, the entire contents of each of which are hereby incorporated by reference for all purposes.

BACKGROUND\SUMMARY

The operating efficiency of a turbocharged multi-cylinder internal combustion engine may be increased by dividing the engine cylinders into at least two groups and, at low loads, deactivating one group of cylinders. The exhaust lines of the two or more groups may be arranged to couple with a two-channel turbine such that the deactivable group of cylinders is attached to one channel and the active group is attached to the other channel.

One example approach to increase the operating efficiency of the engine is to deactivate a group of cylinders using variable valve drives, wherein the charge air mass which flows into the combustion chamber during the intake process is controlled by the inlet valve lift and the exhaust gas which flows into the exhaust system is controlled by the exhaust valve lift. The valves therefore remain in a closed position during deactivation of the cylinders and block exhaust flow from the deactivated cylinders to the turbine. Another example approach to increase the operating efficiency of the engine is to deactivate a group of cylinders by stopping the fuel supply and/or the applied ignition to the cylinders. Here, the deactivated cylinders continue to participate in the charge exchange if the associated valve drive of the cylinders is not deactivated or may not be deactivated. Therefore, charge air may be passed to the turbine of the turbocharger.

A potential issue noted by the inventors with the variable valve drive approach above is the cost associated with implementing them, thus variable valve drives may be unsuitable for series production. Further, variable valve drives reduce the overall mass flow to the turbocharger during a partial deactivation, reducing the turbine pressure ratio. Another potential issue noted by the inventors when the fuel supply and/or the applied ignition is stopped to deactivate the cylinders is that the cylinders still participate in the charge exchange, which has the effect of decreasing the benefits of the partial deactivation. Another potential issue noted by the inventors is that the pressure pulses may attenuate in the two-channel turbine when each group of cylinders (e.g. the deactivable and active cylinder groups) is coupled to a channel, during a partial deactivation of the engine.

A potential approach to at least partially address some of the above issues includes a supercharged internal combustion engine comprising at least two cylinders, in which each cylinder has at least one outlet opening adjoining an exhaust line for discharging exhaust gases via an exhaust-gas discharge system and at least one inlet opening adjoining an intake line for the supply of charge air via an intake system. The cylinders are configured in such a way that they form at least two groups with in each case at least one cylinder, wherein the at least one cylinder of the first group is a cylinder which is in operation even in the event of a partial deactivation of the internal combustion engine and the at least one cylinder of a second group is formed as a cylinder which can be switched in a load-dependent manner. An exhaust-gas turbocharger is provided which comprises a turbine arranged in the exhaust-gas discharge system and a compressor arranged in the intake system. The exhaust lines of the cylinders of each cylinder group merge in each case to from an overall exhaust line such that an exhaust manifold is formed and the two overall exhaust lines are connected to a two-channel turbine. The two-channel turbine comprises at least one rotor mounted on a rotatable shaft in a turbine housing, in such a way that in each case one overall exhaust line is connected to one of the two inlet openings of the turbine, wherein each inlet opening is adjoined by one channel of the turbine. A first shut-off element is provided, which in a first working position blocks the channel assigned to the second cylinder group and separates the channel from the at least one rotor and in a second working position, opens up the channel and connects the channel to the at least one rotor. Further, at least one exhaust-gas recirculation arrangement may be provided.

As an example, the fuel supply and applied ignition may be stopped to deactivate the switchable cylinders when the engine is operating below a threshold load for a time period to enact a partial deactivation. During the partial deactivation, the shut-off element may be adjusted to change a degree of fluid coupling between the channel and the exhaust line of the switchable cylinders. The control of the exhaust flow of the deactivable cylinders in response to engine load keeps pressure pulses from attenuating in the turbine of the turbocharger and removes the need for the cylinders to be mechanically closed, thereby improving the overall engine efficiency. Further, the exhaust emissions may be decreased during partial deactivation by blocking the channel.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1a, 1b and 1c schematically show a first embodiment of the turbocharged internal combustion engine.

FIGS. 2a, 2b, and 2c schematically show a second embodiment of the turbocharged internal combustion engine.

DETAILED DESCRIPTION

Figure 3:
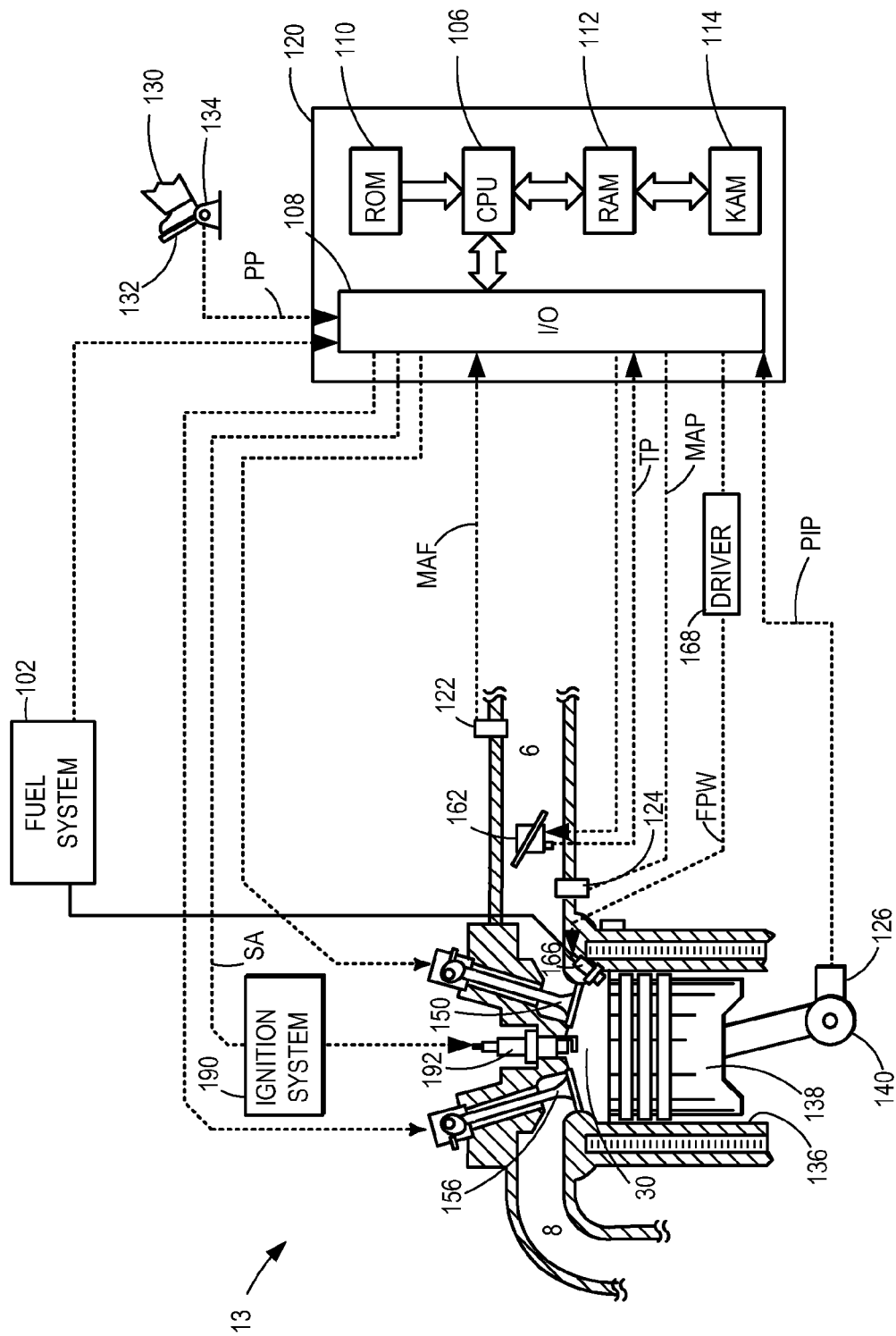
FIG. 3 shows an example cylinder of an internal combustion engine.

The present application relates to a supercharged, applied ignition internal combustion engine having at least two cylinders, in which each cylinder has at least one outlet opening adjoining an exhaust line for discharging the exhaust gases via an exhaust-gas discharge system and each cylinder has at least one inlet opening adjoining an intake line for the supply of charge air via an intake system. The at least two cylinders may be configured in such a way that they form at least two groups with in each case at least one cylinder, wherein the at least one cylinder of a first group is a cylinder which is in operation even in the event of a partial deactivation of the internal combustion engine, and the at least one cylinder of a second group is formed as a cylinder which can be switched in a load-dependent manner. Further, at least one exhaust-gas turbocharger is provided which comprises a turbine arranged in the exhaust-gas discharge system and a compressor arranged in the intake system. The exhaust lines of the cylinders of each cylinder group merge in each case to from an overall exhaust line such that an exhaust manifold is formed and the two overall exhaust lines are connected to a two-channel turbine. The exhaust lines of the cylinders of each cylinder group may be connected to a two-channel turbine in such a way that in each case one overall exhaust line is connected to one of the two channels of the turbine wherein the first overall exhaust line, which has a larger volume, is connected to the first channel, which has the smaller length and the smaller volume, and the second overall exhaust line, which has a smaller volume, is connected to the second channel, which has the greater length and the greater volume. The two-channel turbine comprises at least one rotor mounted on a rotatable shaft in a turbine housing, in such a way that in each case one overall exhaust line is connected to one of the two inlet openings of the turbine, wherein each inlet opening is adjoined by one channel of the turbine. A first shut-off element is provided, which in a first working position blocks the channel assigned to the second cylinder group and separates the channel from the at least one rotor and in a second working position, opens up the channel and connects the channel to the at least one rotor. Further, at least one exhaust-gas recirculation arrangement may be provided.

The present application also relates to a method of operating an internal combustion engine of said type.

An internal combustion engine of the above-stated type is used as a motor vehicle drive unit. Within the context of the present application, the expression "internal combustion engine" encompasses diesel engines, Otto-cycle engines, hybrid internal combustion engines, which utilize a hybrid combustion process, and hybrid drives, which comprise the internal combustion engine and also an electric machine which is connected in terms of drive to the internal combustion engine and which receives power from the internal combustion engine or which, as a switchable auxiliary drive, outputs additional power.

In the development of internal combustion engines, it is a basic aim to decrease fuel consumption, wherein the emphasis in the efforts being made is on obtaining an increase in overall efficiency.

Fuel consumption and thus efficiency pose a potential issue, for example, in the case of Otto-cycle engines, that is to say, in the case of applied-ignition internal combustion engines. The reason for this lies in the principle of the operating process of the Otto-cycle engine. Load control is generally carried out by a throttle flap provided in the intake system. By adjusting the throttle flap, the pressure of the inducted air downstream of the throttle flap may be reduced to a greater or lesser extent. The further the throttle flap is closed, that is to say the more said throttle flap blocks the intake system, the higher the pressure loss of the inducted air across the throttle flap, and the lower the pressure of the inducted air downstream of the throttle flap and upstream of the inlet into the at least two cylinders, that is to say combustion chambers. For a constant combustion chamber volume, it is possible in this way for the air mass, that is to say the quantity, to be set by the pressure of the inducted air. This also explains why quantity regulation has proven to be disadvantageous, specifically in the part-load range, because low loads may need a high degree of throttling and a significant pressure reduction in the intake system, as a result of which the charge exchange losses increase with decreasing load and increasing throttling.

To reduce the described losses, various strategies for dethrottling an Otto-cycle engine have been developed.

One approach to a solution for dethrottling the Otto-cycle engine is for example an Otto-cycle engine working process with direct injection. The direct injection of the fuel is suitable for realizing a stratified combustion chamber charge. The direct injection of the fuel into the combustion chamber thus permits quality regulation in the Otto-cycle engine, within certain thresholds. The mixture formation takes place by the direct injection of the fuel into the cylinder or into the air situated in the cylinders, and not by external mixture formation, in which the fuel is introduced into the inducted air in the intake system.

Another option for optimizing the combustion process of an Otto-cycle engine includes the use of an at least partially variable valve drive. By contrast to conventional valve drives, in which both the lift of the valves and also the timing are invariable, these parameters which have an influence on the combustion process, and thus on fuel consumption, can be varied to a greater or lesser extent by variable valve drives. If the closing time of the inlet valve and the inlet valve lift can be varied, this alone makes throttling-free and thus loss-free load control possible. The mixture mass or charge air mass which flows into the combustion chamber during the intake process is then controlled not by a throttle flap but rather by the inlet valve lift and the opening duration of the inlet valve. Variable valve drives are however very expensive and are therefore often unsuitable for series production.

A further approach to a solution for dethrottling an Otto-cycle engine is offered by cylinder deactivation, that is to say the deactivation of individual cylinders in certain load ranges. The efficiency of the Otto-cycle engine in part-load operation may be increased by a partial deactivation because the deactivation of one cylinder of a multi-cylinder internal combustion engine increases the load on the other cylinders, which remain in operation, if the engine power remains constant, such that the throttle flap can or must be opened further in order to introduce a greater air mass into said cylinders, whereby dethrottling of the internal combustion engine is attained overall. During the partial deactivation, the cylinders which are permanently in operation operate in the region of higher loads, at which the specific fuel consumption is lower. The load collective is shifted toward higher loads.

The cylinders which remain in operation during the partial deactivation furthermore exhibit improved mixture formation owing to the greater air mass or mixture mass supplied. In one example, the cylinders may tolerate higher exhaust-gas recirculation rates.

Further advantages, with regard to efficiency, may be attained in that a deactivated cylinder, owing to the absence of combustion, does not generate wall heat losses owing to heat transfer from the combustion gases to the combustion chamber walls.

The internal combustion engine according to the present application is also an applied-ignition internal combustion engine suitable for partial deactivation, that is to say an internal combustion engine with at least one deactivatable cylinder.

The multi-cylinder internal combustion engines with partial deactivation described in the prior art, and the associated methods for operating said internal combustion engines, nevertheless have considerable potential for improvement, as will be explained briefly below.

If, for the purpose of the partial deactivation, the fuel supply to the deactivatable cylinders is stopped and/or the applied ignition is deactivated, the deactivated cylinders continue to participate in the charge exchange if the associated valve drive of said cylinders is not deactivated or cannot be deactivated. The charge exchange losses thus generated by the deactivated cylinders lessen, and counteract the improvements achieved with regard to fuel consumption and efficiency by the partial deactivation, such that the benefit of the partial deactivation is at least partially lost, that is to say the partial deactivation in fact yields an altogether less pronounced improvement.

In practice, it is not expedient for the above-described disadvantageous effects to be remedied through the provision of switchable valve drives, because switchable valve drives, such as variable valve drives, are expensive and may not be suitable for series production.

Furthermore, in the case of internal combustion engines supercharged by an exhaust-gas turbocharger, switchable valve drives lead to further problems because the turbine of an exhaust-gas turbocharger has to be configured for a certain exhaust-gas flow rate, and thus also for a certain number of cylinders. If the valve drive of a deactivatable cylinder is deactivated, the overall mass flow through the cylinders of the internal combustion engine is reduced owing to the omission of the mass flow through the deactivated cylinder. The exhaust-gas mass flow conducted through the turbine decreases, and the turbine pressure ratio decreases as a result. This has the effect that the charge pressure ratio likewise decreases, that is to say the charge pressure falls, and a small amount of fresh air or charge air is or may be supplied to the cylinders that remain in operation. The small charge-air flow may also have the effect that the compressor operates beyond the surge threshold.

The effects described above lead to a restriction of the practicability of the partial deactivation, specifically to a restriction of the load range in which the partial deactivation may be used. The reduced charge-air flow rate that is supplied to the cylinders which are in operation during the partial deactivation also reduces the effectiveness or quality of the combustion and has an adverse effect on the fuel consumption and pollutant emissions.

The charge pressure during a partial deactivation, and thus the charge-air flow rate supplied to the cylinders that remain in operation, may, for example, be increased by a small configuration of the turbine cross section and by simultaneous exhaust-gas blow-off, whereby the load range relevant for a partial deactivation would also be expanded again. This approach however has the disadvantage that the supercharging behavior is inadequate when all the cylinders are in operation.

The charge pressure during a partial deactivation, and thus the charge-air flow rate supplied to the cylinders that are still in operation, could also be increased by virtue of the turbine being equipped with a variable turbine geometry, which permits an adaptation of the effective turbine cross section to the present exhaust-gas mass flow. The exhaust-gas back pressure in the exhaust-gas discharge system upstream of the turbine may then however simultaneously increase, leading in turn to higher charge-exchange losses in the cylinders that are still in operation.

Further, according to the prior art, the exhaust lines which adjoin the outlet openings are at least partially integrated in the cylinder head and are merged to form a common overall exhaust line or in groups to form two or more overall exhaust lines. The merging of exhaust lines to form an overall exhaust line is referred to generally as an exhaust manifold, wherein the overall exhaust line can be regarded as belonging to the exhaust manifold.

The way in which the exhaust lines of the at least four cylinders are merged in the specific situation, that is to say the specific configuration of the exhaust-gas discharge system, is dependent substantially on that operating range of the internal combustion engine which is given priority, that is to say the operating ranges for which the operating behavior of the internal combustion engine is to be optimized.

In the case of supercharged internal combustion engines in which at least one turbine of an exhaust-gas turbocharger is provided in the exhaust-gas discharge system and which are intended to exhibit satisfactory operating behavior at low engine speeds and/or in the case of relatively low exhaust-gas flow rates, so-called impulse supercharging is desired, that is to say preferable.

Here, the dynamic wave phenomena which occur in the exhaust-gas discharge system—in particular during the charge exchange—should be utilized for the purpose of supercharging and for improving the operating behavior of the internal combustion engine.

The evacuation of the combustion gases out of a cylinder of the internal combustion engine during the charge exchange is based substantially on two different mechanisms. When the outlet valve opens close to bottom dead center at the start of the charge exchange, the combustion gases flow at high speed through the outlet opening into the exhaust-gas discharge system on account of the high pressure level prevailing in the cylinder at the end of the combustion and the associated high pressure difference between the combustion chamber and exhaust line. Said pressure-driven flow process is assisted by a high pressure peak which is also referred to as a pre-outlet shock and which propagates along the exhaust line at the speed of sound, with the pressure being dissipated, that is to say reduced, to a greater or lesser extent with increasing distance traveled as a result of friction.

During the further course of the charge exchange, the pressures in the cylinder and in the exhaust line are equalized, such that the combustion gases are no longer evacuated primarily in a pressure-driven manner but rather are discharged as a result of the reciprocating movement of the piston.

At low engine speeds, the pre-outlet shock can advantageously be utilized for impulse supercharging, wherein temporally short, high pressure pulses can be utilized to best effect for energy utilization in the turbine. In this way, it is possible by means of exhaust-gas turbocharging to generate high charge-pressure ratios, that is to say high charge pressures on the inlet side, even in the case of only low exhaust-gas flow rates, in particular at low engine speeds.

Impulse supercharging has proven to be particularly advantageous for accelerating the turbine rotor, that is to say for increasing the turbine rotational speed, which can fall to a noticeable extent during idle operation of the internal combustion engine or at low exhaust-gas flow rates, and which should frequently be increased again with as little delay as possible by means of the exhaust-gas flow in the event of an increased load demand. The inertia of the rotor and the friction in the shaft bearing arrangement generally slow an acceleration of the rotor to higher rotational speeds and therefore hinder an immediate rise in the charge pressure.

To be able to utilize the dynamic wave phenomena occurring in the exhaust-gas discharge system, in particular the pre-outlet shocks, for the impulse supercharging for improving the operating behavior of the internal combustion engine, the pressure peaks or pre-outlet shocks in the exhaust-gas discharge system must be maintained. It is therefore advantageous if the pressure pulses in the exhaust lines do not attenuate one another or cancel one another out.

In this regard, it is expedient for the cylinders to be grouped, or for the exhaust lines to be merged, in such a manner that the high pressures, in particular the pre-outlet shocks of the individual cylinders, in the exhaust-gas discharge system are maintained, and mutual influencing can be substantially prevented.

Exhaust gas which has already been expelled or discharged into an exhaust line during the charge exchange can thus pass back into the cylinder again, specifically as a result of the pressure wave originating from another cylinder.

It has proven to be particularly disadvantageous if positive pressure prevails at the outlet opening of a cylinder toward the end of the charge exchange, because in this phase of the charge exchange, the combustion gases are expelled primarily owing to the stroke movement of the piston. With regard to the charge exchange, problems arise in particular at low engine speeds if, during a valve overlap in which the outlet valve is not yet closed when the inlet valve is open, exhaust gas is, with acceptance of purging losses, to be substantially purged from the cylinder.

The problem regarding the mutual influencing of the cylinders during the charge exchange is of increasing relevance because, in modern internal combustion engines, the exhaust lines or the exhaust manifolds are being designed to be ever shorter, in particular because the exhaust manifolds are increasingly commonly being integrated into the cylinder head.

The short exhaust lines may have the effect that the cylinders of the internal combustion engine adversely affect one another during the charge exchange, and in particular that the effect achieved by means of residual gas purging that takes place is at least partially nullified.

Here, the internal combustion engine utilizes the fact that both the two exhaust manifolds and also the two turbine channels have different volumes, and said volumes influence the dynamic wave phenomena in the exhaust-gas discharge system and thus also the impulse supercharging or the pressure pulses that define the impulse supercharging. The first overall exhaust line that belongs to the first exhaust manifold and thus to the large-volume exhaust manifold is connected to the first channel, which has the smaller length and the smaller volume, whereas the second overall exhaust line that belongs to the second exhaust manifold and thus to the small-volume exhaust manifold is connected to the second channel, which has the greater length and the greater volume.

Specifically, it must be taken into consideration that different volumes of the exhaust-gas discharge subsystems comprising a manifold and a channel lead to disadvantageous effects with regard to the operating behavior of the internal combustion engine during impulse supercharging.

Specifically, different volumes lead to pressure pulses of different magnitude at the end of the channels upstream of the rotor. A variation of the amplitude of the pressure pulses is however disadvantageous with regard to impulse supercharging. Rather, it is desirable for pressure pulses to be of equal magnitude at the end of both channels upstream of the inlet into the rotor, and thus for the volumes of the two subsystems to be as equal as possible.

The distances that the pressure pulses must cover in the respective exhaust-gas discharge subsystems from the outlet opening to the rotor also differ, that is to say are of different lengths, for which reason the time intervals between the pressure pulses arriving at the rotor likewise differ, that is to say vary.

The combination, that is to say the targeted combination, of the overall exhaust lines with the channels also serves to reduce or eliminate the difference in the distances, such that the pressure pulses arrive at the rotor regularly and at equal time intervals.

As discussed in detail above, the internal combustion engine is advantageously characterized in that the two exhaust-gas discharge subsystems of the two cylinder groups, which extend from the outlet openings of the respective cylinders as far as the rotor and comprise in each case one manifold and the associated channel, differ as little as possible in terms of exhaust-gas volume, and the pressure pulses have to cover similar distances to reach the rotor.

Against the background of that stated above, it is an object of the present application to provide a supercharged, applied-ignition internal combustion engine according to the preamble of claim 1, which is improved with regard to the partial deactivation and the exhaust-gas turbo charging.

It is a further sub-object of the present application to specify a method for operating an internal combustion engine of said types.

The first sub-object is achieved by a supercharged, applied-ignition internal combustion engine having at least two cylinders, in which each cylinder has at least one outlet opening adjoining an exhaust line for discharging the exhaust gases via an exhaust-gas discharge system, and each cylinder has at least one inlet opening adjoining an intake line for the supply of charge air via an intake system. Further, the at least two cylinders may be configured in such a way that they form at least two groups with in each case at least one cylinder, wherein the at least one cylinder of a first group is a cylinder which is in operation even in the event of a partial deactivation of the internal combustion engine, and the at least one cylinder of a second group is formed as a cylinder which can be switched in a load-dependent manner. At least one exhaust-gas turbocharger is provided which comprises a turbine arranged in the exhaust-gas discharge system and a compressor arranged in the intake system, which internal combustion engine is characterized in that the exhaust lines of the cylinders of each cylinder group merge in each case to form an overall exhaust line such that an exhaust manifold is formed and the two overall exhaust lines may be connected to a two-channel turbine, which comprises at least one rotor mounted on a rotatable shaft in a turbine housing, in such a way that in each case one overall exhaust line is connected to one of the two inlet openings of the turbine. Each turbine inlet opening is adjoined by one channel of the turbine, and a first shut-off element is provided which, in a first working position, blocks the second channel assigned to the second cylinder group and separates said second channel from the at least one rotor, and in a second working position, opens up said second channel and connects said second channel to the at least one rotor.

In a further embodiment of the first sub-object, at least one exhaust-gas recirculation arrangement is provided.

The internal combustion engine is equipped with a two-channel turbine, whereby the supercharging behavior, that is to say the torque characteristics, is considerably improved, for example, during the partial deactivation.

The second channel assigned to the switchable cylinders may be blocked by a shut-off element during a partial deactivation. This prevents a situation in which exhaust gas originating from the cylinders that remain in operation flows over into the second channel. In this way, the dynamic wave phenomena occurring in the exhaust-gas discharge system may be utilized for improving the supercharging behavior.

In this connection, it must be taken into consideration that the evacuation of the combustion gases from a cylinder during the course of the charge exchange is based substantially on two different mechanisms. When the outlet valve opens at the start of the charge exchange, the combustion gases flow at high speed through the outlet opening into the exhaust-gas discharge system on account of the high pressure level prevailing in the cylinder at the end of the combustion and the associated high pressure difference between the combustion chamber and exhaust line. Said pressure-driven flow process is assisted by a high pressure peak which is also referred to as a pre-outlet shock and which propagates along the exhaust line at the speed of sound, with the pressure being dissipated, that is to say reduced, to a greater or lesser extent with increasing distance traveled as a result of friction. During the further course of the charge exchange, the pressures in the cylinder and in the exhaust line are equalized, such that the combustion gases are no longer evacuated primarily in a pressure-driven manner but rather may be discharged as a result of the reciprocating movement of the piston.

The high pressure pulses of the pre-outlet shocks may be utilized for pulse supercharging, for which reason it is advantageous for the pressure pulses in the exhaust-gas discharge system to be maintained and for measures to be implemented to better enable that the pressure pulses of the individual cylinders do not attenuate one another or cancel one another out.

Here, the internal combustion engine according to the present application may be expedient if, when the cylinders are deactivated, the second channel of the turbine is blocked by a shut-off element such that the pressure pulses of the cylinders that remain in operation cannot propagate into said second channel and be dissipated or attenuated, wherein the exhaust-gas volume situated in the second channel between the at least one deactivated cylinder and the rotor may impart a damping action.

In the context of a partial deactivation, it is the case at low loads and low engine speeds, at which the frequency of the pressure fluctuations in the exhaust-gas discharge system decreases, that the internal combustion engine according to the present application is advantageous, for example, for improving, that is to say increasing, the torque at low engine speeds.

In the internal combustion engine according to the present application, it is furthermore the case that the discharge of the exhaust gas from the at least one deactivated cylinder via the exhaust-gas discharge system is prevented during a partial deactivation, without the switchable cylinders having to be equipped with switchable valve drives, which entail high costs. The first shut-off element, in the first working position, blocks the second channel and thus also the exhaust lines of the cylinders which may be switched in a load-dependent manner. The at least one deactivated cylinder duly continues to participate in the charge exchange if the associated valve drive of said cylinder continues to be operated and is not deactivated. However, the at least one deactivated cylinder does not impart a delivery action into the exhaust-gas volume situated between its outlet openings and the first shut-off element, or through the turbine.

With the internal combustion engine according to the present application, a supercharged, applied-ignition internal combustion engine is provided which is improved with regard to the partial deactivation and the exhaust-gas turbocharging. The first object on which the present application is based is thereby achieved.

The internal combustion engine according to the present application has at least two cylinders or at least two groups with in each case at least one cylinder. In this respect, internal combustion engines with three cylinders which may be configured in three groups with in each case one cylinder, or internal combustion engines with six cylinders which may be configured in three groups with in each case two cylinders, may be considered internal combustion engines according to the present application, for example. Within the context of a partial deactivation, the three cylinder groups may be activated or deactivated in succession, whereby two-time switching may also be realized. The partial deactivation is thereby further optimized. The cylinder groups may also comprise a different number of cylinders, for example, in the case of a three-cylinder engine; the cylinders may form one group with one cylinder and one group with two cylinders.

The embodiments according to the present application improves the efficiency of the internal combustion engine in part-load operation, that is to say at low loads, wherein a low load may be a load which amounts to less than 50%, preferably less than 30%, of the upper threshold load at the present engine speed.

Further advantageous embodiments of the supercharged, applied-ignition internal combustion engine will be discussed in conjunction with the subclaims.

Embodiments of the supercharged, applied-ignition internal combustion engine may be advantageous in which the first shut-off element is provided at the rotor-side end of the second channel. In this way, the exhaust-gas volume situated between the first shut-off element and the rotor is decreased, and the exhaust gas originating from the cylinders that are in operation is to the greatest possible extent prevented, that is to say stopped, from flowing over from the first channel into the second channel. This results in an optimization of the pulse supercharging.

Embodiments of the supercharged, applied-ignition internal combustion engine may be advantageous in which the two channels or the two overall exhaust lines or the exhaust manifolds of the cylinder groups may be connected to one another, that is to say, have at least one connection.

In this connection, embodiments of the supercharged, applied-ignition internal combustion engine may be advantageous in which the two channels in the turbine housing are separated from one another by a housing wall, wherein at the rotor side the housing wall ends at a distance from the at least one rotor, and in so doing contributes, at its rotor-side end, to the formation of a connection between the two channels.

The pulse supercharging described in detail above also has disadvantages. For example, the charge exchange is generally impaired as a result of the pressure pulses in the exhaust-gas discharge system. The cylinders may have an interfering, that is to say detrimental effect on one another during the charge exchange. The pressure waves originating from a cylinder run through the exhaust line of said cylinder and also along the exhaust lines of the other cylinders, possibly as far as the outlet opening thereof, as a result of which already-discharged exhaust gas may pass into said cylinders again.

It must also be taken into consideration that a turbine may be operated more effectively if the turbine is subjected to a constant exhaust-gas pressure. With regard to as high a turbine efficiency as possible, a pressure upstream of the turbine, that is to say of the rotor, which changes little is preferable in order to realize so-called ram supercharging.

By means of a correspondingly large exhaust-gas volume, or as large as possible an exhaust-gas volume, upstream of the turbine, the pressure pulsations in the exhaust lines may be smoothed. In this respect, a separation of the channels as far as the rotor, with the volume of the exhaust-gas discharge system upstream of the rotor being divided into multiple sub-volumes, may be highly disadvantageous. With regard to ram supercharging, it is therefore advantageous for the two channels of the turbine, and thus the two exhaust manifolds of the cylinder groups, to be connected to one another.

The embodiment in question thus provides a connection between the two channels. The housing wall provided in the turbine housing separates the channels from one another over the greatest possible distance, as far as a point a short distance upstream of the rotor.

To switch from pulse supercharging during a partial deactivation to ram supercharging when all of the cylinders are in operation, it is necessary to be able to open and close the connection between the channels.

Since the internal combustion engine according to the present application already has a first shut-off element which, for the purposes of partial deactivation, is moved from a second working position into a first working position in order to block the second channel assigned to the at least one deactivated cylinder, it may be highly advantageous to also be able to utilize the first shut-off element for opening and closing the connection between the channels.

Therefore, embodiments of the supercharged, applied-ignition internal combustion engine may be advantageous in which the first shut-off element is provided at the rotor-side end of the second channel and blocks the connection in the first working position and opens up said connection in the second working position.

Embodiments may be advantageous wherein the first overall exhaust line is connected to the first channel, which has the smaller length and the smaller volume, and the second overall exhaust line is connected to the second channel, which has the greater length and the greater volume. This measure serves to reduce, and ideally eliminate, the difference between the two volumes generated upstream of the rotor in each case by the volume of a channel and the volume of the associated exhaust manifold.

In a second embodiment of the supercharged, applied-ignition internal combustion engine may be advantageous in which the first shut-off element, in the first working position, connects the second channel to a recirculation line while blocking a connection between the two channels and, in the second working position, separates the second channel from said recirculation line while forming a connection between the two channels, wherein the recirculation line issues into the intake line of the at least one cylinder which may be switched in a load-dependent manner.

In the second embodiment, the gas flow or the exhaust-gas flow from the deactivated cylinders is blocked and is diverted, specifically recirculated. During the partial deactivation of the internal combustion engine, the deactivated cylinders are supplied not with charge air but rather with exhaust gas from the associated overall exhaust line, which exhaust gas is introduced via the recirculation line into the intake line of the deactivated cylinder in order to reduce the charge-exchange losses of the deactivated cylinder. The recirculation line serves as a short-circuit line and effects a pressure equalization between the inlet side and the outlet side of a deactivated cylinder. This contributes considerably to the reduction of the charge-exchange losses. The deactivated cylinders pump the recirculated exhaust gas from the inlet side to the outlet side, in the manner of a compressor.

By virtue of hot exhaust gas being conducted through the deactivated cylinders during the partial deactivation, said cylinders may not cool down. This has advantages with regard to pollutant emissions, for example with regard to the emissions of unburned hydrocarbons, because the deactivated cylinders reach or exhibit their operating temperature again immediately after the end of the partial deactivation. Strictly speaking, hot exhaust gas is not recirculated via the recirculation line permanently during the partial deactivation, it rather being the case that, at least during the first working cycle of the partial deactivation, the exhaust gas of the preceding working cycle, and thus the hot exhaust gas of the final fired working cycle, is recirculated. During the subsequent working cycles of the partial deactivation, slowly cooling exhaust gas with a greater or lesser fraction of relatively cool charge air is introduced into the at least one deactivated cylinder. Nevertheless, this is in the present case referred to as the recirculation of hot exhaust gas.

Embodiments of the supercharged, applied-ignition internal combustion engine may be advantageous in which a third shut-off element is provided in the recirculation line. The third shut-off element serves for the adjustment of the recirculated exhaust-gas flow rate and of the pressure gradient between the inlet side and the outlet side of a deactivated cylinder. In this respect, the third shut-off element may also be used for keeping the exhaust-gas flow rate constant, that is to say uniform, during the partial deactivation.

Embodiments of the supercharged, applied-ignition internal combustion engine may be advantageous in which, in the intake line of the at least one cylinder which may be switched in a load-dependent manner, there is provided a second shut-off element which opens up the intake line for the supply of charge air when the cylinder is activated and which blocks said intake line when the cylinder is deactivated. Further, in the second embodiment it may be advantageous if the recirculation line issues downstream of said second shut-off element into the intake line of the at least one cylinder which may be switched in a load-dependent manner.

For example, in a second embodiment, during the partial deactivation, the deactivated cylinders are not supplied with charge air but only with exhaust gas from the associated overall exhaust line. For this purpose, the intake lines of the deactivated cylinders may be closed off by the second shut-off element, wherein the recirculation line issues downstream of the shut-off elements into the intake lines that are separated from the intake side. One hundred percent exhaust-gas recirculation may thus be realized.

Embodiments of the supercharged, applied-ignition internal combustion engine may be advantageous in which the first shut-off element, second shut-off element, and/or third shut-off element is continuously adjustable.

For example, the third shut-off element as a continuously adjustable valve permits precise dosing of the exhaust-gas flow rate recirculated into the deactivated cylinders, similarly to the adjustment of the recirculation rate of an exhaust-gas recirculation arrangement by an EGR valve. The dimensioning of the recirculated exhaust-gas flow rate may be performed in an operating-point-specific manner, for example with regard to the lowest possible charge-exchange losses.

Embodiments of the supercharged, applied-ignition internal combustion engine may be advantageous in which the first shut-off element, the second shut-off element, and/or the third shut-off element is switchable in a two-stage fashion.

For example, the first shut-off element blocks the second channel during the partial deactivation and opens up said second channel again after the end of the partial deactivation, for which purpose a shut-off element which is switchable in a two-stage fashion may be sufficient. A similar situation applies for the second shut-off element arranged in the intake line of a deactivated cylinder and opening up said intake line again after the end of the partial deactivation.

Embodiments of the supercharged, applied-ignition internal combustion engine may be advantageous in which the first shut-off element and/or the second shut-off element and/or the third shut-off element is a valve or a pivotable flap or a throttle flap.

The shut-off elements may be electrically, hydraulically, pneumatically, mechanically or magnetically controllable, by an engine controller.

Embodiments of the supercharged, applied-ignition internal combustion engine may be advantageous in which the first shut-off element is an element that is displaceable in translatory fashion, that is to say a slide.

Embodiments of the supercharged, applied-ignition internal combustion engine may be advantageous in which at least one exhaust-gas aftertreatment system, for example an oxidation catalytic converter, a three-way catalytic converter, a storage catalytic converter, a selective catalytic converter and/or a particle filter, is provided in the exhaust-gas discharge system.

In the case of supercharged, applied-ignition internal combustion engines having four cylinders in an in-line arrangement, embodiments are advantageous in which the two outer cylinders and the two inner cylinders form in each case one group.

To substantially maintain the pressure pulses of the pre-outlet shocks for the purpose of pulse supercharging during a partial deactivation, it is expedient for the cylinders to be grouped in a suitable way, or for the exhaust lines to be merged in a suitable way, such that mutual influencing of the cylinders of a group is prevented. In a cylinder head having four cylinders in an in-line arrangement, it is advantageous in this regard for two cylinders which have an ignition interval of 360° CA to be combined in each case to form a cylinder group. For example, if the ignition in the cylinders is initiated in accordance with the ignition sequence 1-2-4-3 or in accordance with the ignition sequence 1-3-4-2, it is advantageous for the outer cylinders to be combined to form a first group and for the inner cylinders to be combined to form a second group.

Such a grouping or configuration of the exhaust-gas discharge system does not only have advantages with regard to possible impulse supercharging, which is to say with regard to improvement of the torque characteristic of the internal combustion engine at low engine speeds. In fact, further advantages arise in particular with regard to residual gas purging or with regard to the reduction of the residual gas fraction in the cylinders.

In the internal combustion engine, the two overall exhaust lines are combined with the two channels not indiscriminately, that is to say arbitrarily, but rather in a very particular way in order to optimize the impulse supercharging by means of the two-channel turbine. Here, the internal combustion engine utilizes the fact that both the two exhaust manifolds and also the two turbine channels have different volumes, and said volumes influence the dynamic wave phenomena in the exhaust-gas discharge system and thus also the impulse supercharging or the pressure pulses that define the impulse supercharging. The first overall exhaust line that belongs to the first exhaust manifold and thus to the large-volume exhaust manifold is connected to the first channel, which has the smaller length and the smaller volume, whereas the second overall exhaust line that belongs to the second exhaust manifold and thus to the small-volume exhaust manifold is connected to the second channel, which has the greater length and the greater volume.

The distances that the pressure pulses must cover in the respective exhaust-gas discharge subsystems from the outlet opening to the rotor also differ, that is to say are of different lengths, for which reason the time intervals between the pressure pulses arriving at the rotor likewise differ, that is to say vary.

The combination according to the invention, that is to say the targeted combination, of the overall exhaust lines with the channels also serves to reduce or eliminate the difference in the distances, such that the pressure pulses arrive at the rotor regularly and at equal time intervals.

Embodiments of the internal combustion engine are advantageous in which the first exhaust manifold has a larger volume than the second exhaust manifold. The reasons are those that have already been stated above.

Embodiments of the internal combustion engine are advantageous in which the two-channel turbine is a dual-flow turbine, preferably a dual-flow turbine in which the two channels are arranged one on top of the other as viewed in a section perpendicular to the axis of rotation of the at least one rotor and, at least along an arc-shaped segment, enclose the at least one rotor in spiral form at different radii.

In the case of dual-flow turbines, the two channels are arranged at different radial distances from the shaft of the rotor, for which reason the two channels of a dual-flow turbine inevitably have different lengths and different volumes, and the measure according to the invention for the combination of the overall exhaust lines with the channels has a particularly advantageous effect.

If, as a two-channel turbine, use is made of a dual-flow turbine, embodiments are advantageous in which each channel has, at the rotor-side end, an outlet opening which surrounds the at least one rotor along an arc-shaped segment of substantially 180°.

Embodiments of the internal combustion engine may also be advantageous in which the two-channel turbine is a twin-flow turbine, preferably a twin-flow turbine in which the two channels are arranged adjacent to one another and, at least along an arc-shaped segment, enclose the at least one rotor in spiral form at equal radii.

Embodiments of the supercharged, applied-ignition internal combustion engine may be advantageous in which an exhaust-gas recirculation arrangement is provided which comprises a line which branches off from the exhaust-gas discharge system and issues into the intake system.

Exhaust-gas recirculation, that is to say the recirculation of combustion gases, is suitable for reducing the nitrogen oxide emissions, wherein it is possible for the nitrogen oxide emissions to be considerably reduced with increasing exhaust-gas recirculation rate. Here, the exhaust-gas recirculation rate $x_{EGR}$ is determined as $x_{EGR}=m_{EGR}/(m_{EGR}+m_{fresh\ air})$, where $m_{EGR}$ denotes the mass of recirculated exhaust gas and $m_{fresh\ air}$ denotes the supplied fresh air which is conducted through the compressor and compressed. To obtain a considerable reduction in nitrogen oxide emissions, high exhaust-gas recirculation rates are considered, which may be of the order of magnitude of $x_{EGR}\approx 60\%$ to 70%.

Here, embodiments of the supercharged, applied-ignition internal combustion engine may be advantageous in which a valve for adjusting the recirculated exhaust-gas flow rate is arranged in the line of the exhaust-gas recirculation arrangement.

Embodiments of the supercharged, applied-ignition internal combustion engine may be advantageous in which the line of the exhaust-gas recirculation arrangement branches off from the exhaust-gas discharge system upstream of the turbine of the at least one exhaust-gas turbocharger and issues into the intake system downstream of the compressor of the at least one exhaust-gas turbocharger.

In the case of said so-called high-pressure EGR arrangement, the exhaust gas is extracted from the exhaust-gas discharge system upstream of the turbine and is fed into the intake system downstream of the compressor, whereby the exhaust gas is not subjected to exhaust-gas aftertreatment, for example being supplied to a particle filter, before being recirculated, because there is no risk of fouling of the compressor.

In the case of the operation of an applied-ignition internal combustion engine with exhaust-gas turbocharging and the simultaneous use of high-pressure EGR, a conflict may however arise because the recirculated exhaust gas is no longer available for driving the turbine. For example, in the event of an increase in the exhaust-gas recirculation rate, the exhaust-gas flow being introduced into the turbine decreases. The reduced exhaust-gas mass flow through the turbine leads to a lower turbine pressure ratio, as a result of which the charge pressure ratio also falls, which equates to a smaller charge-air flow. One solution to this is so-called low-pressure EGR. By contrast to high-pressure EGR, in the case of low-pressure EGR, exhaust gas which has already flowed through the turbine is introduced into the intake system. For this purpose, the low-pressure EGR arrangement has a recirculation line which branches off from the exhaust-gas discharge system downstream of the turbine and issues into the intake system upstream of the compressor.

The exhaust gas which is recirculated via the low-pressure EGR arrangement to the inlet side is mixed with fresh air upstream of the compressor. The mixture of fresh air and recirculated exhaust gas produced in this way forms the charge air which is supplied to the compressor and compressed.

Since, within the low-pressure EGR arrangement, exhaust gas is conducted through the compressor, said exhaust gas must be previously subjected to exhaust-gas aftertreatment, for example the particle filter. Depositions in the compressor which change the geometry of the compressor, for example the flow cross sections, and thereby impair the efficiency of the compressor, must be prevented.

Embodiments of the supercharged, applied-ignition internal combustion engine may be advantageous in which each cylinder is equipped with direct-injection system for the introduction of fuel.

Here, embodiments are advantageous in which each cylinder is equipped with an injection nozzle for the purposes of direct injection.

The fuel supply may be deactivated more quickly and more reliably, for the purposes of the partial deactivation, in the case of direct-injection internal combustion engines than in the case of internal combustion engines with intake pipe injection, in which fuel residues in the intake pipe lead to undesired combustions in the deactivated cylinder.

Nevertheless, embodiments of the applied-ignition internal combustion engine may be advantageous in which an intake pipe injection is provided for the purposes of supplying fuel.

The second sub-object on which the present application is based, specifically that of specifying a method for operating a supercharged, applied-ignition internal combustion engine of a type described above, is achieved by a method which is characterized in that the first shut-off element is moved into the first working position during a partial deactivation.

That which has already been stated with regard to the internal combustion engine according to the present application also applies to the method according to the present application, for which reason reference is generally made at this juncture to the statements made above with regard to the supercharged internal combustion engine. The different internal combustion engines require, in part, different method variants.

Method variants may be advantageous in which the at least one switchable cylinder of the second group is switched as a function of the load T of the internal combustion engine, in such a way that said at least one switchable cylinder is deactivated if a predefinable load $T_{down}$ is undershot and is activated if a predefinable load $T_{up}$ is exceeded.

The threshold load is predefined for the undershooting and exceedance and may be of equal magnitude, though they may also differ in magnitude. In one example, a single threshold load may be set and when undershot, the switchable cylinders are deactivated, and when in exceedance, the switchable cylinders are activated. In another example, a threshold load, Tdown, may be set for undershooting and a second threshold load with a different magnitude, Tup, may be set for exceedance. When the internal combustion engine is in operation, the cylinders of the first cylinder group are cylinders which are permanently in operation. Switching of the second cylinder group, that is to say an activation and deactivation of said second group, takes place.

Embodiments of the method may be advantageous in which the predefinable load $T_{down}$ and/or $T_{up}$ is dependent on the engine speed n of the internal combustion engine. Then, there is not one specific load, upon the undershooting or exceedance of which switching takes place regardless of the engine speed n. Instead, an engine-speed-dependent approach is followed, and a region in the characteristic map is defined in which partial deactivation takes place.

It is basically possible for further operating parameters of the internal combustion engine, for example the engine temperature or the coolant temperature after a cold start of the internal combustion engine, to be taken into consideration as a criterion for a partial deactivation.

Method variants may be advantageous in which the fuel supply to the at least one switchable cylinder is deactivated in the event of deactivation. This yields advantages with regard to fuel consumption and pollutant emissions, thus assisting the aim pursued by the partial deactivation, specifically that of reducing fuel consumption and improving efficiency.

Method variants may be advantageous in which each cylinder is equipped with an ignition device for the initiation of an applied ignition, wherein the ignition device of the at least one switchable cylinder is deactivated in the event of partial deactivation.

The above method variant relates to the use of the method in the case of an applied-ignition internal combustion engine, for example a direct-injection Otto-cycle engine, the cylinders of which may be equipped in with an ignition device for initiating an applied ignition.

The present application will be explained in more detail below on the basis of the first and second embodiments of the supercharged internal combustion engine according to the following FIGS. 1-6.

FIGS. 1a, 1b, and 1c schematically show a first embodiment of the supercharged applied-ignition internal combustion engine 13. The example internal combustion engine 13 shown is an in-line four cylinder engine 13 in which the four cylinders 1, 2, 3, 4 may be arranged along the longitudinal axis of the cylinder head. Thus, the cylinders form a line.

Each of the cylinders has an inlet opening adjoining an intake line 5a, 5b for the supply of charge air via an intake system 6 and an outlet opening adjoining an exhaust line 7a, 7b for discharging exhaust gases via an exhaust-gas discharge system 8. For supercharging the engine 13, an exhaust-gas turbocharger 12 is provided which comprises a turbine 12a being arranged in the exhaust-gas discharge system 8 and a compressor 12b being arranged in an overall intake line 6a of the intake system 6. The fresh air supplied to the cylinders 1, 2, 3, 4 of the engine 13 is compressed in the compressor 12b, which is driven by the turbine 12a via shaft 12c. The turbine, in turn, is driven by the enthalpy of the exhaust-gas flow. The turbine 12a is a two-channel turbine 12a, illustrated as a twin-flow turbine 12A in FIGS. 1b and 1c.

An exhaust-gas aftertreatment system 16 is provided downstream of the turbine 12a in the exhaust-gas discharge system 8. Aftertreatment system 16 may be a selective catalytic reduction (SCR) system, a three way catalyst (TWC), a NOx trap, various other emission control devices, or any combination thereof. Further, during operation of engine 13, aftertreatment system 16 may be periodically reset by operating at least one cylinder of the engine within an air/fuel ratio, for example.

The cylinders 1, 2, 3, 4, are configured in such a way that they form at least two groups with in each case two cylinders. For example, the two outer cylinders 1, 4 form a first group, which is in operation even in the event of a partial deactivation of the internal combustion engine 13, and the two inner cylinders 2, 3 form a second group, which may be switched in a load-dependent manner and are deactivated during a partial deactivation. In another example, the cylinders may be grouped in such a way that they form at least two groups with at least one cylinder per group. Further, engines with more or less than four cylinders may be grouped in a similar manner as described above.

The intake lines 5a, 5b of the cylinders 1, 2, 3, 4 of each cylinder group merges to form the overall intake line 6a such that an intake manifold is formed. Further, a second shut-off element, not shown, may be positioned on intake lines 5b to control intake air flow in the event of a partial deactivation of the second group of cylinders. For example, the second shut-off element may be a flap which is opened to allow charge air when the switchable cylinders are active.

The exhaust lines 7a of the cylinders 1, 4 of the first group merge to form an overall exhaust line 7A and the exhaust lines 7b of the cylinders 2, 3 of the second group merge to form an overall exhaust line 7B such that an exhaust manifold is formed. The two overall exhaust lines 7A, 7B are connected to the two-channel turbine 12a, wherein each of the overall exhaust lines 7A, 7B issues into one of the channels 14A, 14B of the two-channel turbine 12a, as further elaborated in FIGS. 1b and 1c. The overall exhaust line 7A from the first group of cylinders connects to a first channel 14A and the overall exhaust line 7B from the second group of cylinders connects to a second channel 14B.

FIGS. 1b and 1c show, in a half section cut along the axis of rotation 11a of the rotor 11, the two channels 14A, 14B of the two-channel turbine 12a as the twin-flow turbine 12A of a first embodiment of the supercharged internal combustion engine. The twin-flow turbine 12A is characterized in that the two channels 14A, 14B are arranged adjacent to one another and surround the rotor 11 at equal radii at least in section. The two channels 14A, 14B are arranged in the turbine housing 10 at the same radial distance from the shaft 11a of the turbine 12A.

The housing wall 10a of the turbine housing 10 separates the two channels 14A, 14B from one another until a point a short distance upstream of the inlet into the rotor 11. The rotor-side free end of the housing wall 10a thus has a spacing to the rotor 11, and in this way contributes to the formation of a connection 10b between the two channels 14A, 14B.

A first shut-off element 9 is positioned at the rotor-side free end of the second channel 14B and is shown as a slide 9a with translatory displacement (shown as the double arrows). The first shut-off element may be moved such that the connection 10b is opened, as shown in FIG. 1b in a second working position, or closed, as shown in FIG. 1c in a first working position. For example, the second group of cylinders may be deactivated when an engine load is below a threshold and to block exhaust-gas from the second channel 14B, the first shut-off element 9 may be moved from a second working position to a first working position to close the connection 10b and block exhaust flow from the exhaust line through the channel 14B, wherein the active cylinders of the first group still flow exhaust through the first channel 14A. In another example, when an engine load is above a threshold, the first and second groups of cylinders are active and the shut-off element is placed in the second working position, allowing exhaust flow through the two channels 14A, 14B and opening the connection 10b.

Further, the first shut-off element may be operated to change the degree of fluid coupling between the channel and the exhaust line responsive to an increasing engine load. For example, as the engine load increases, the first shut-off element may be moved in a translatory fashion from a first working position towards a second working position, increasing the opening between the exhaust line and the channel.

FIGS. 2a, 2b, and 2c schematically show a second embodiment of the supercharged internal combustion engine 13. It is sought to explain the differences from FIGS. 1a, 1b, and 1c and as such like parts are numbered similarly.

Engine 13, depicted as an in-line four cylinder engine, groups the cylinders as described previously in FIG. 1a. The intake lines 5b of the second group of cylinders 2, 3 have flaps 19, which serve as second shut-off elements, for varying the supply of charge air from the intake system 6 when the second group of cylinders 2, 3 is switched. For example, the flaps 19 may block the intake lines 5b when the second group of cylinders 2, 3 is deactivated for the purpose of a partial deactivation of the internal combustion engine 13. In another example, the flaps 19 may open up the intake lines 5b for the supply of charge air via the intake system 6 to the inner cylinders 2, 3 when the second group of cylinders 2, 3 is activated during normal engine operation.

Engine 13 further comprises a high pressure EGR system 15 for the recirculation of exhaust gas. A high pressure EGR line 15a is shown branching from overall exhaust line 7A of the exhaust-gas discharge system 8 upstream of the turbine 12a and issuing into the overall intake line 6a of the intake system 6 downstream of the compressor 12b. A valve 18 is included for adjusting the recirculated exhaust-gas flow rate and is arranged in EGR line 15a. For example, the valve 18 may be opened to increase the EGR rate when all of the cylinders are active to minimize NOx emissions.

The exhaust lines 7a, 7b of the cylinders 1, 2, 3, 4 of each cylinder group merge in each case to form an overall exhaust 7A, 7B such that an exhaust manifold is formed. The two overall exhaust lines 7A, 7B are connected to the two-channel turbine 12a, wherein each case one overall exhaust line 7A, 7B issues into one channel 14A, 14B of the turbine 12a. Further, an EGR system 17 is coupled with the channel connected to the second group of cylinders, which are deactivable. EGR system 17 comprises recirculation line 17a which branches from the exhaust line of the switchable cylinders at the second channel 14B of the two-channel turbine 12a and issues into the intake line 5b of the switchable cylinders downstream of the flaps 19. Further, a third shut-off element 22, which may be an EGR valve, may be positioned in the recirculation line 17a to vary the flow of recirculated exhaust gas. In one example, when the shut-off element is being transitioned to the first position, the opening of the EGR valve may be increased to allow a higher exhaust flow rate through the recirculation line.

The recirculation line 17a serves for introducing exhaust gas into the deactivated cylinders during a partial deactivation. The recirculation line 17a may serve to effect pressure equalization between the inlet side and outlet side of the deactivated cylinders 2, 3 during the partial deactivation, whereby the charge-exchange losses of said cylinders 2, 3 during the partial deactivation are reduced. For example, the third shut-off element may be operated to provide a constant recirculation rate to the switchable cylinders during a partial deactivation.

FIGS. 2b and 2c show the working positions of the first shut-off element 20, illustrated as a slide 20a. EGR line 17a is shown connecting to the second channel 14B via passage 21a. The slide 20a is moved from the first working position (see FIG. 2c) into the second working position (see FIG. 2b), and vice versa by translatory displacement (see the double arrow). The first shut-off element 20 may be moved in a load-dependent manner.

FIG. 2b shows the slide 20a in a second working position. The slide 20a blocks passage 21a, separating the channel from the EGR line 17a, and opening the connection 10b. The second channel 14B is opened to the rotor and exhaust gas flow is blocked through the EGR line 17a.

FIG. 2c shows the slide 20a in a first working position. The EGR system 17 is connected via passage 21a to route the exhaust flow from the second group of cylinders 2, 3 when the slide 20a is in a first working position to the EGR line 17a. The slide blocks exhaust flow through the second channel 14B, closing the connection 10b between the two channels 14A, 14B while opening a passage to the EGR line 17a. For example, transitioning a shut-off element from a second position to a first position allows the exhaust flow through the recirculation line 17a to the intake line of the switchable cylinders. This may occur in response to a request for increased engine dilution.

During partial deactivation, the recirculation line 17a allows the exhaust gas to recirculate from the exhaust side to the intake side of the engine. The amount of recirculating gas can be controlled via valve 22. The recirculation line enables a pressure balancing between engine exhaust (7b) and intake side (5b) to reduce pumping losses.

FIG. 3 shows a schematic of an example cylinder 30 of an engine 13 which may be used at one or more of the cylinder locations in FIGS. 1 and 2. Cylinder 30 may be a variable displacement and/or a multi-stroke cylinder, for example. Cylinder 30 is at least partially defined by combustion chamber walls 136 and piston 138. Piston 138 may be coupled to a crankshaft 140 via a crank arm, along with other pistons of the engine. Crankshaft 140 may be coupled to at least one drive wheel of a vehicle via a transmission, not depicted. Cylinder 30 may be controlled by controller 120.

Controller 120 is shown in FIG. 3 as a microcomputer, including processor 106, input/output ports 108, an electronic storage medium for executable programs and calibration values shown as read only memory chip 110, in this example, random access memory 112, keep alive memory 114, and a data bus. Controller 120 can communicate with various sensors and actuators of engine 13 via input/output ports 108. Controller 120 may receive various signals from sensors coupled to engine 13, including, for example, measurement of inducted mass air flow (MAF) from mass air flow sensor 122; an indication of a request or input (PP) from vehicle operator 130 via position sensor 134 of pedal 132; a profile ignition pickup (PIP) signal from Hall effect sensor 126 (or other type) coupled to crankshaft 140; throttle position (TP) from a throttle position sensor; and absolute manifold pressure signal, MAP, from sensor 124. Engine speed signal, RPM, may be generated by controller 120 from PIP signal. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa.

Storage medium read-only memory chip 110 can be programmed with computer readable data representing instructions executable by processor 106 for performing the methods described below as well as other variants that are anticipated but not specifically listed. The controller 120 may receive input data from the various sensors, process the input data, and trigger the actuators in response to the processed input data based on instruction or code programmed therein corresponding to one or more routines. An example control routine is described herein with regard to FIGS. 4, 5 and 6.

Cylinder 30 may receive intake air from an intake system 6 and may exhaust combustion gases via exhaust-gas discharge system 8. Intake system 6 and exhaust-gas discharge system 8 can selectively communicate with cylinder 30 via respective intake valve 150 and exhaust valve 156.

Intake system 6 may include throttle 162 having a throttle plate. In this example, the position of the throttle plate may be varied by controller 120 via signals provided to an electric motor or actuator included with throttle 162, a configuration that is commonly referred to as electronic throttle control (ETC). In this manner, throttle 62 may be operated to vary the intake air provided to cylinder 30 among other engine cylinders. The position of the throttle plate may be provided to controller 120 by throttle position signals TP. Pressure, temperature, and mass air flow may be measured at various points along intake system 6. For example, intake system 6 may include a mass air flow sensor 122 for measuring clean air mass flow entering through throttle 162. The clean air mass flow may be communicated to controller 120 via the MAF signal.

Fuel injector 166 is shown coupled directly to cylinder 30 for injecting fuel directly therein in proportion of the pulse width of signal FPW received from controller 120 via electronic driver 168. In this manner, fuel injector 166 provides what is known as direct injection of fuel into cylinder 30. The fuel injector may be mounted in the side of the combustion chamber of in the top of the combustion chamber, for example. Fuel may be delivered to fuel injector 66 by a fuel system 102 including, for example, a fuel tank, a fuel pump, and a fuel rail.

Ignition system 190 can provide an ignition spark to cylinder 30 via spark plug 192 in response to spark advance signal SA from controller 120, under select operation modes. Though spark ignition components are shown, cylinder 30 or one or more other cylinders of engine 13 may be operated in a compression ignition mode, with or without an ignition spark, for example.

Cylinder 30, illustrated in FIG. 3, may be adjusted to match the components of the first or second embodiment as shown in FIGS. 1 and 2. For example, a high pressure EGR line may be added to the exhaust-gas discharge system 8 of the cylinder 30.

Figure 4:
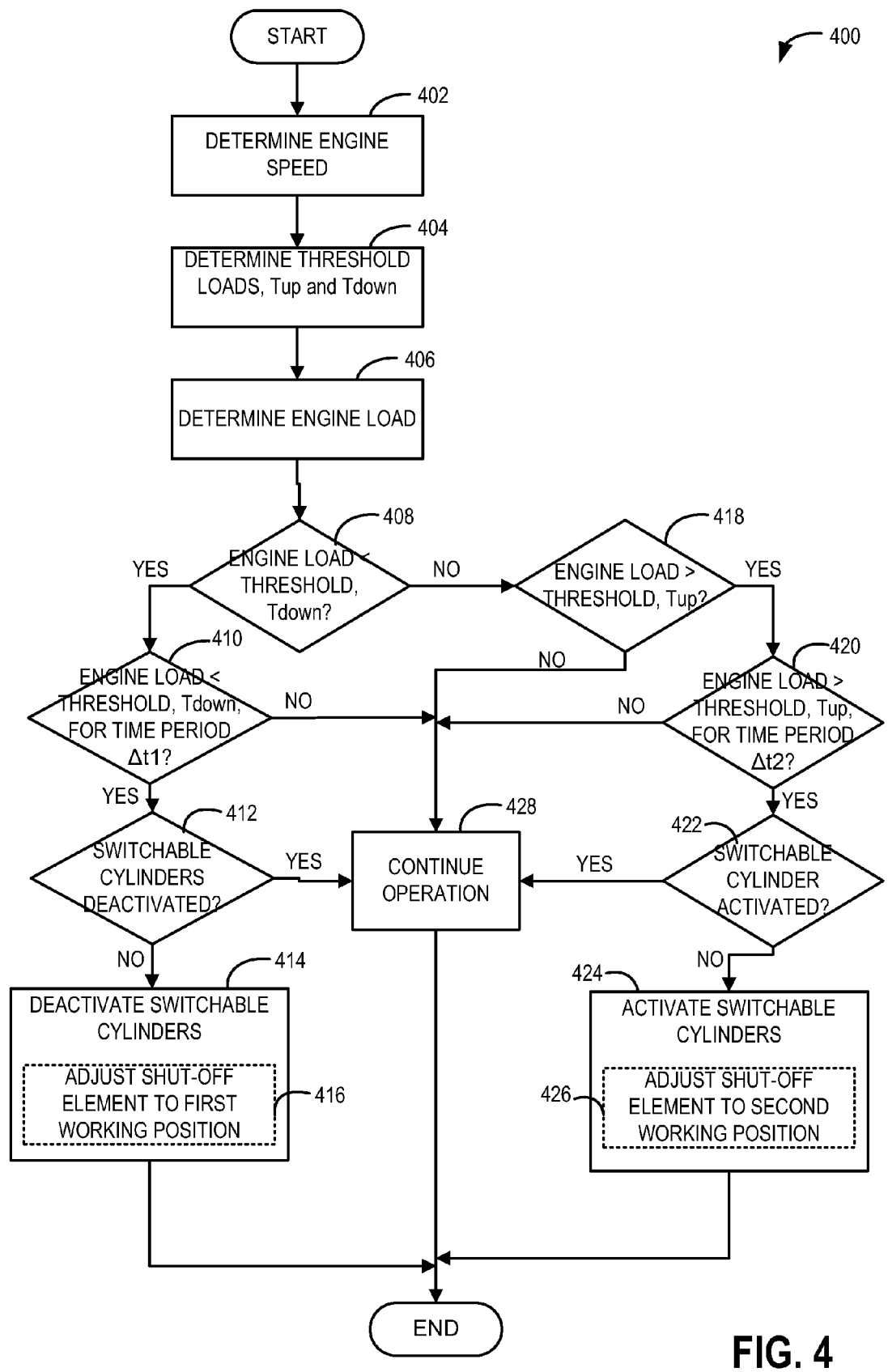
FIG. 4 illustrates an example method for the first embodiment.

Turning to FIG. 4 an example method 400 is shown for the first embodiment. The method 400 may adjust the shut-off element to change a degree of fluid coupling between the channel and the exhaust line of a switchable cylinder responsive to an increasing engine load.

At 402, the method may determine the engine speed.

At 404, the method may determine the threshold loads. The threshold loads, Tup and Tdown, are predefined loads for determining an engine partial deactivation. In one example, Tup and Tdown may be of equal magnitude. In this example, Tup and Tdown may differ in magnitude. Further, the threshold loads may be based on the engine speed. For example, the thresholds may be determined regardless of engine speed, or they may be determined based on an engine-speed dependent approach. The threshold loads may be stored as a characteristic map in the storage medium read-only memory chip.

At 406, the method may determine the engine load.

At 408, the method may determine if the engine load is less than the threshold load Tdown. At low engine loads, below Tdown, deactivating a group of cylinders increases the load on the remaining active cylinders, thereby decreasing specific fuel consumption and shifting load collective toward a higher load. If yes, the engine load is less than Tdown, the method may proceed to 410 and determine if the engine load is less than Tdown for a time period Δt1. The time period allows for shifts in the engine load without unnecessary cylinder deactivations. For example, if the engine load is lower than Tdown but then increases during the time period Δt1, the method may proceed to 428 and continue operation with no cylinder deactivation. If the engine load is below Tdown for the time period Δt1, the method may proceed to 412 and determine if the switchable cylinders are deactivated. If yes, the cylinders are deactivated, the method may proceed to 428 and continue operation. If no, the cylinders are not deactivated, the method may proceed to 414 and deactivate the switchable cylinders.

At 416, the method may adjust the shut-off element to a first working position, as illustrated in FIG. 1c. For example, adjusting the shut-off element include moving the shut-off element to the first working position in response to the engine load being below the threshold for a predetermined time period. The channel to the turbine coupled with the exhaust lines of the deactivated cylinders is blocked to decrease attenuation of the pressure pulses in the turbine.

If no at 408, the engine load is not less than Tdown, the method may proceed to 418 and determine if the engine load is greater than Tup. If the engine load is not greater than Tup, the method may proceed to 428 and continue operation. If yes, the engine load is greater than Tup, the method may proceed to 420 and determine if the engine load is greater than Tup for the time period Δt2. In one example, the time period Δt2 may be set to be the same as Δt1. In another example, the time period Δt2 may be set to be different than Δt1. If no, the engine load is not greater than Tup for the time period Δt2, the method may proceed to 428 and continue operation. If yes, the engine load is above a threshold for the time period Δt2, the method may proceed to 422.

At 422, the method may determine if the switchable cylinders are activated. If yes, the switchable cylinders are already active, the method may proceed to 428 and continue operation. If no, the switchable cylinders are not active, the method may proceed to 424 and activate the switchable cylinders.

At 426, the method may adjust the shut-off element to the second working position, wherein the channel coupled to the exhaust lines of the switchable cylinders is opened to allow exhaust flow to the turbine, as illustrated in FIG. 1b. Moving the shut-off element to the second position may be done when the engine load is above the threshold for the time period, for example, during a period of acceleration.

Figure 5:
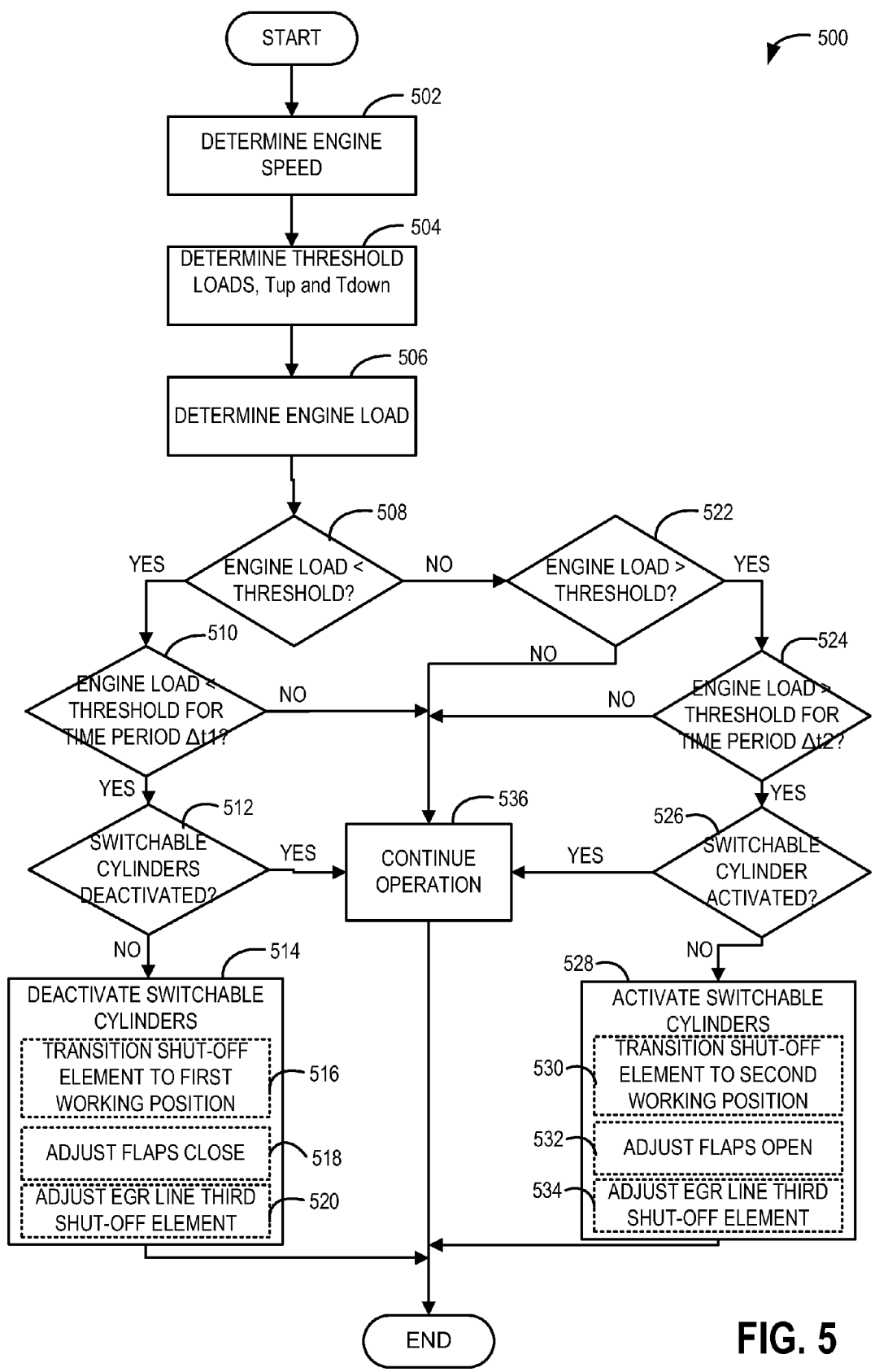
FIG. 5 illustrates an example method for the second embodiment.

Turning to FIG. 5 an example method 500 is shown for the second embodiment of the internal combustion engine comprising transitioning a shut-off element positioned in a channel of a two-channel turbine, wherein the channel is connected with an exhaust line of a switchable cylinder as well as a passage to an exhaust gas recirculation line. Further, the method may adjust the position of an EGR valve in the recirculation line based on the position of the shut-off element.

At 502, the method may determine the engine speed.

At 504, the method may determine the threshold loads. The threshold loads, Tup and Tdown, are predefined loads for determining an engine partial deactivation. In one example, Tup and Tdown may be of equal magnitude. In another example, Tup and Tdown may differ in magnitude. Further, the threshold loads may be based on the engine speed. For example, the thresholds may be determined regardless of engine speed, or they may be determined based on an engine-speed dependent approach. The thresholds Tup and Tdown may be stored as a characteristic map in the storage medium read-only memory chip.

At 506, the method may determine the engine load.

At 508, the method may determine if the engine load is less than the threshold load Tdown. At low engine loads, below Tdown, deactivating a group of cylinders increases the load on the remaining active cylinders, thereby decreasing specific fuel consumption and shifting load collective toward a higher load. If yes, the engine load is less than Tdown, the method may proceed to 510 and determine if the engine load is less than Tdown for a time period Δt1. The time period allows for shifts in the engine load without unnecessary cylinder deactivations. For example, if the engine load is lower than Tdown but then increases during the time period Δt1, the method may proceed to 536 and continue operation with no cylinder deactivation. In another example, if the engine load is below Tdown for the time period Δt1, the method may proceed to 512 and determine if the switchable cylinders are deactivated. If yes, the cylinders are deactivated, the method may proceed to 536 and continue operation. If no, the cylinders are not deactivated, the method may proceed to 514 and deactivate the switchable cylinders.

At 516, the method may transition the shut-off element to a first working position, where exhaust flows from the turbine into an intake line of the switchable engine cylinder, as illustrated in FIG. 2c. Thus no exhaust flows from the turbine to the exhaust line at the first position. Further, at 518, the flaps may be adjusted to block intake air into the deactivated cylinders.

At 520, the method may adjust the EGR line valve for the EGR line coupled with the turbine channel of the deactivated cylinders. For example, the EGR line valve may be opened during deactivation of the switchable cylinders to allow exhaust to recirculate through the cylinders and keep the operating temperature constant.

If no at 508, the engine load is not less than Tdown, the method may proceed to 522 and determine if the engine load is greater than Tup. If the engine load is not greater than Tup, the method may proceed to 536 and continue operation. If yes, the engine load is greater than Tup, the method may proceed to 524 and determine if the engine load is greater than Tup for the time period Δt2. If no, the engine load is not greater than Tup for the time period Δt2, the method may proceed to 536 and continue operation. If yes, the engine load is greater than Tup for the time period Δt2, the method may proceed to 526.

At 526, the method may determine if the switchable cylinders are activated. If yes, the switchable cylinders are already active, the method may proceed to 536 and continue operation. If no, the switchable cylinders are not active, the method may proceed to 528 and transition the shut-off element positioned in the channel of the two-channel turbine to a second position, where exhaust flows from the turbine into an exhaust line of a switchable engine cylinder.

At 530, the method may transition the shut-off element to the second working position, wherein the channel coupled to the exhaust lines of the switchable cylinders is opened to allow exhaust flow to the turbine, as illustrated in FIG. 2b. Thus, no exhaust flows from the turbine to the intake line of the switchable cylinders. At 532, the method may adjust the flaps on the intake line of the switchable cylinders to an open position to allow the introduction of intake charge air to the switchable cylinders.

At 534, the method may adjust the EGR line valve for the EGR line coupled with the turbine channel of the deactivated cylinders. For example, the EGR line valve may be closed during activation of the switchable cylinders to block intake air from entering the recirculation line when the flaps are open.

Figure 6:
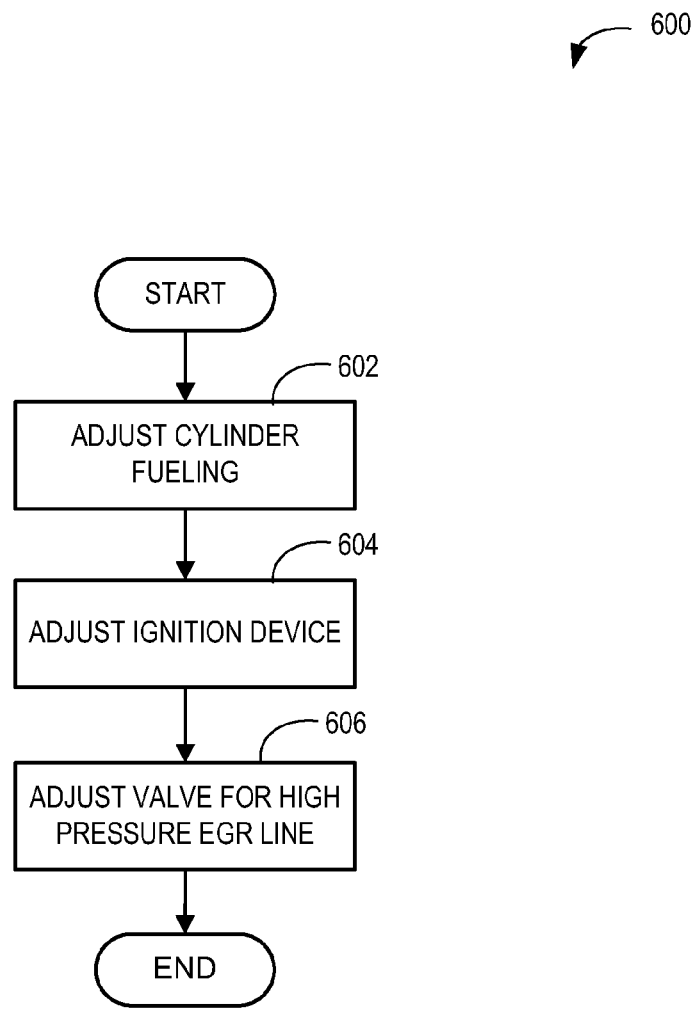
FIG. 6 illustrates an example method for a cylinder of an internal combustion engine.

Turning the FIG. 6 an example method 600 is outlined which may be run to optimize cylinder operations. For example, method 600 may be run after the operating state of the switchable cylinders change, such as at 414, 426 in FIG. 4 or 514 and 528 in FIG. 5. In another example, the method 600 may be run based on an engine operating condition, such as an acceleration request from a driver.

At 602, the method may adjust the fueling of the switchable cylinders and active cylinders based on engine load. For example, during a partial deactivation, the fueling may be deactivated for the switchable cylinders in response to an engine load being lower than a threshold.

At 604, the method may adjust the ignition timing. For example, during a partial deactivation, the ignition timing may be stopped for the deactivated cylinders.

At 606, the method may adjust the valve of the high pressure EGR line which branches from the exhaust line of the group of active cylinders to the overall intake line. For example, during partial deactivation, the valve opening of the high pressure EGR line is modulated to adjust the EGR rate for the active cylinders. The method may then end.

Figure 7:
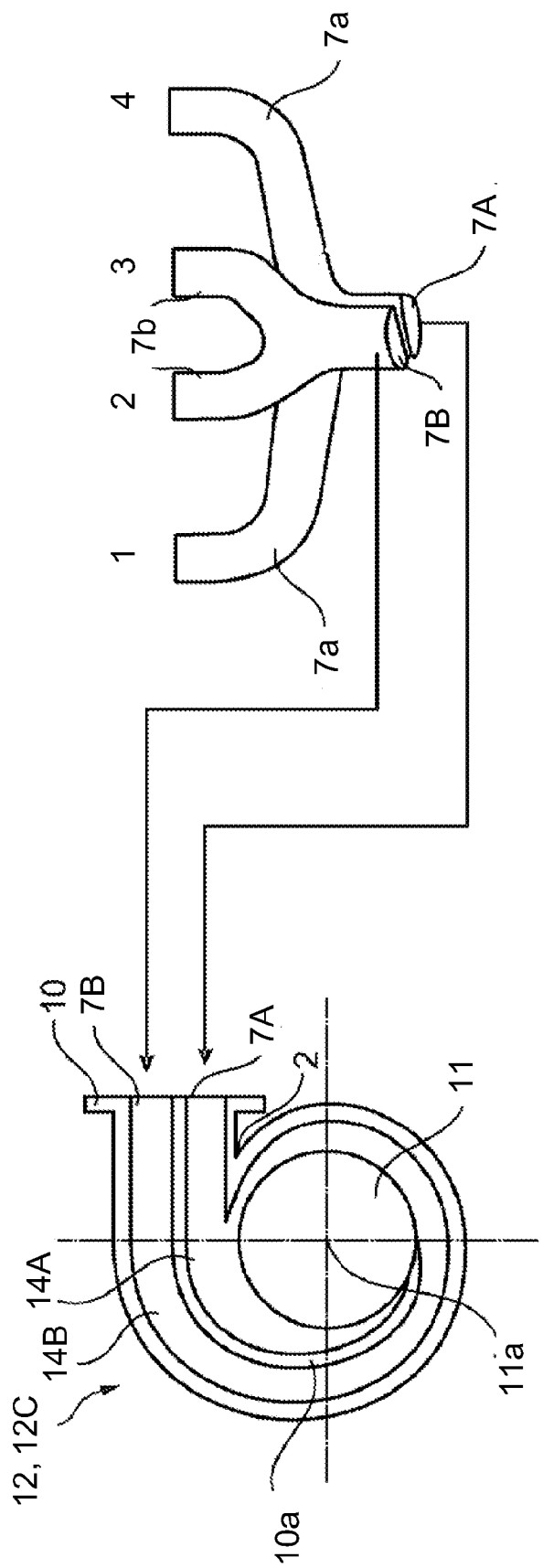
FIG. 7 schematically shows a graphic assignment configuration of two channels of a dual-flow turbine to two overall exhaust lines.

Turning to FIG. 7 a schematic is shown depicting a configuration of the two channels 14A, 14B of a dual-flow turbine 12C joining with the two overall exhaust lines 7A, 7B. The dual-flow turbine shows the two channels 14A, 14B arranged one on top of the other as viewed in a section perpendicular to the axis of rotation 11a of the at least one rotor 11 and, at least along an arc-shaped segment, enclose the at least one rotor 11 in spiral form at different radii from the rotor 11. The two channels 14A, 14B have different lengths and different volumes.

The exhaust gas-discharge system of the associated four-cylinder internal combustion engine is shown with the two outer cylinders 1,4 forming a first group of cylinders with exhaust lines 7a merging to form overall exhaust line 7A. The two inner cylinders 2, 3 form a second group of cylinders with exhaust lines 7b merging to form overall exhaust line 7B.

In each case, one overall exhaust line 7A, 7B is connected to one of the two channels 14A, 14B of the turbine 12. The first overall exhaust line 7A and thus the large-volume first manifold is connected to the channel 14A which has the smaller length and smaller volume. The second overall exhaust line 7B and thus the small-volume second manifold is connected to the second channel 14B, which has the greater length and the greater volume. The second group of cylinders, which is deactivable, includes the shut-off element in the channel as illustrated in the previous FIGS. 1b, 1c, 2b, and 2c.

It is better enabled in this way that the two exhaust-gas discharge subsystems comprising in each case one overall exhaust line 7A, 7B and one channel 14A, 14B have a similar volume upstream of the rotor 11 or the difference between the volumes is as small as possible.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged, applied-ignition internal combustion engine comprising:
   at least two cylinders, in which each cylinder of the at least two cylinders has at least one outlet opening adjoining an exhaust line for discharging exhaust gases via an exhaust-gas discharge system;
   each of the at least two cylinders has at least one inlet opening adjoining an intake line for a supply of charge air via an intake system;
   wherein at least two cylinders are configured in such a way that they form at least two groups with, in each case, at least one cylinder, wherein the at least one cylinder of a first active group is a cylinder which is in operation even in an event of a partial deactivation of the internal combustion engine, and the at least one cylinder of a second, deactivatable group is formed as a cylinder which can be switched in a load-dependent manner;
   at least one exhaust-gas turbocharger is provided which comprises a two-channel turbine arranged in the exhaust-gas discharge system and a compressor arranged in the intake system;
   wherein the exhaust lines of the cylinders of each cylinder group merge in each case to form an overall exhaust line such that an exhaust manifold is formed; and
   the two overall exhaust lines are connected to the two-channel turbine, which comprises at least one rotor mounted on a rotatable shaft in a turbine housing, in such a way that the overall exhaust line of the first active group of cylinders is attached to one inlet opening of the two-channel turbine, and the overall exhaust line of the second deactivatable group of cylinders is attached to the other inlet opening of the two-channel turbine, wherein each of the inlet opening is adjoined by one channel of the two-channel turbine, the two channels in the turbine housing are separated from one another by a housing wall, forming a connection between the two channels and a first shut-off element is provided which, in a first working position, completes the housing wall which closes the connection between the two channels of the two-channel turbine and blocks a second channel assigned to the second deactivatable cylinder group and separates said second channel from the at least one rotor, and in a second working position, which opens the housing wall and opens the connection between the two channels of the two-channel turbine and opens up said second channel and connects said second channel to the at least one rotor;
   wherein first and second intake flaps are provided in respective intake lines of first and second cylinders in the second group upstream of the cylinders and upstream of a cylinder head of the engine and which can be switched in a load-dependent manner which opens up the intake line for the supply of charge air when the cylinder is activated and which blocks the intake line when the cylinder is deactivated.

2. The engine of claim 1, further comprising at least one exhaust-gas recirculation arrangement, where exhaust gas is delivered to the cylinders of the deactivatable group via respective connections in the respective intake lines downstream of the respective first and second intake flaps.

3. The engine of claim 2, wherein the first shut-off element is further positioned to connect the second channel assigned to the deactivatable cylinder group to the exhaust-gas recirculation arrangement of the deactivatable cylinder group when the first shut-off element is in the first working position; and
   separate the second channel from the exhaust-gas recirculation arrangement when the first shut-off element is in the second working position.

4. The engine of claim 3, wherein a third shut-off element is provided in the exhaust-gas recirculation arrangement.

5. The engine of claim 1, wherein the first shut-off element is positioned at a rotor-side end of the second channel.

6. The engine of claim 1, wherein the opening the housing wall connection between the two channels is at a distance upstream of an inlet into the at least one rotor.

7. The engine of claim 6, wherein the first shut-off element in the first working position blocks the connection and in the second working position opens the connection.

8. The engine of claim 1, wherein the two channels of the two-channel turbine have different lengths and different volumes; and
   wherein a first exhaust manifold, which has a greater volume than a second exhaust manifold, is connected to the first channel, which has a smaller length and smaller volume than the second channel, and the second exhaust manifold is connected to the second channel.

9. A method, comprising:
   selectively deactivating switchable cylinders of an engine via respective flaps in respective intake lines upstream of the switchable cylinders with remaining cylinders active, and
   responsive to whether the switchable cylinders are activated or deactivated via the flaps, adjusting a shut-off element positioned in a channel of a two-channel turbine, and thereby closing off a housing wall separating the channels, from a second position, where exhaust flows from the turbine into an exhaust line of the switchable engine cylinders, to a first position, where exhaust flows from the turbine into an intake line of the switchable engine cylinders, wherein the channel is connected with the exhaust line of the switchable cylinders, the step of adjusting further includes changing a degree of fluid coupling between the channel and the exhaust line responsive to an increasing engine load.

10. The method of claim 9, wherein the first position of the shut-off element blocks exhaust flow from the exhaust line through the channel when the engine load is below a threshold and the switchable cylinders are deactivated.

11. The method of claim 10, wherein the first position of the shut-off element opens a passage to an exhaust gas recirculation line coupled with the channel to route exhaust gas to the intake lines of the switchable cylinders.

12. The method of claim 10, wherein adjusting the shut-off element includes moving the shut-off element to the first position in response to the engine load being below the threshold for a time period.

13. The method of claim 10, wherein the second position of the shut-off element allows exhaust flow from the exhaust line through the channel when the engine load is above the threshold and the switchable cylinders are activated.

14. The method of claim 13, wherein the second position of the shut-off element blocks a passage to an exhaust gas recirculation line coupled with the channel to route exhaust gas to the intake lines of the switchable cylinders.

15. The method of claim 13, wherein adjusting the shut-off element includes moving the shut-off element to the second position in response to the engine load being above the threshold for a time period.

16. A method for an engine, comprising:
selectively deactivating switchable cylinders via intake flaps; and
in response to a request for increased engine dilution, transitioning a shut-off element positioned in a channel of a two-channel turbine, and thereby closing off a housing wall separating the channels, from a second position, where exhaust flows from the turbine into an exhaust line of the switchable engine cylinders, to a first position, where exhaust flows from the turbine into an intake line of the switchable engine cylinders.

17. The method of claim 16, wherein at the second position, no exhaust flows from the turbine to the intake line of the switchable cylinders; and
at the first position, no exhaust flows from the turbine to the exhaust line, the method further comprising delivering recycled exhaust gas downstream of the intake flaps.

18. The method of claim 16, further comprising adjusting fueling of the switchable cylinders based on engine load and wherein fueling is deactivated in response to the engine load being lower than a threshold.

19. The method of claim 16, further comprising an EGR valve in a recirculation line coupling the exhaust line of the switchable cylinders to the intake line of the switchable cylinders, wherein a position of the EGR valve is adjusted based on the position of the shut-off element; and
wherein an opening of the EGR valve is increased in response to the shut-off element being transitioned to the first position.

* * * * *